No. 718,273. PATENTED JAN. 13, 1903.
D. McLELLAN.
DEVICE FOR PREVENTING THE SWITCHING OF COWS' TAILS.
APPLICATION FILED JULY 30, 1902.
NO MODEL.
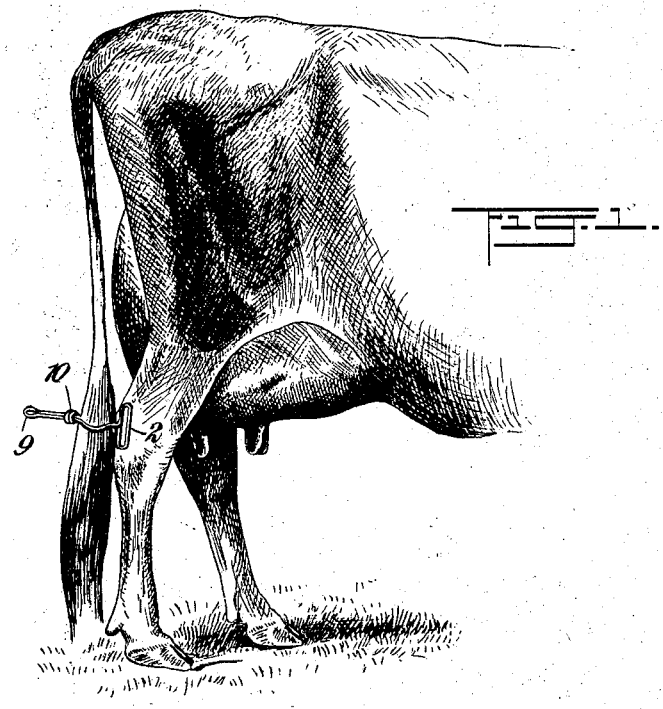
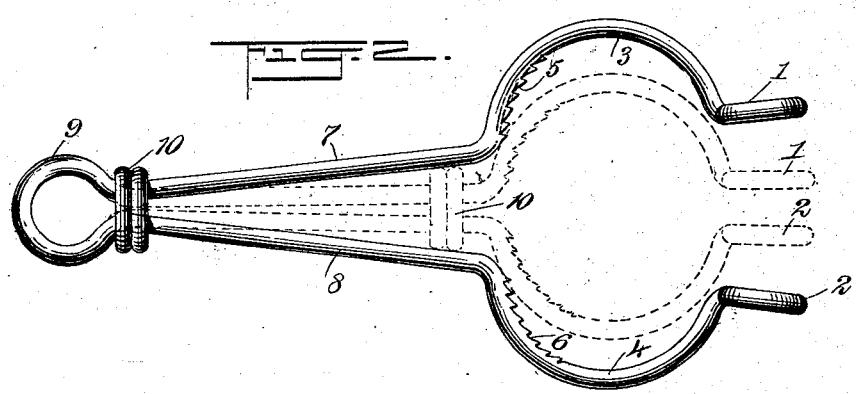
WITNESSES:
INVENTOR
David McLellan
BY
ATTORNEYS.

UNITED STATES PATENT OFFICE.

DAVID McLELLAN, OF BOWESMONT, NORTH DAKOTA.

DEVICE FOR PREVENTING THE SWITCHING OF COWS' TAILS.

SPECIFICATION forming part of Letters Patent No. 718,273, dated January 13, 1903.

Application filed July 30, 1902. Serial No. 117,632. (No model.)

*To all whom it may concern:*

Be it known that I, DAVID MCLELLAN, a citizen of the United States, residing at Bowesmont, in the county of Pembina and State of North Dakota, have invented a new and Improved Device for Preventing the Switching of Cows' Tails, of which the following is a full, clear, and exact description.

My invention relates to a device for preventing the switching of cows' tails during the milking operation.

Reference is to be had to the accompanying drawings, forming a part of this specification, in which similar characters of reference indicate corresponding parts in both figures.

Figure 1 is a fragmentary side elevation showing my device in use; and Fig. 2 is a plan view of the device when removed, also showing in dotted lines the position of the clamping members when applied to the leg and tail of the cow.

A longitudinal section of spring metal is bent into the general form indicated in the drawings, the ends of the section being provided with substantially elliptical eyes 1 2, immediately adjacent to the semicircular portions 3 4, which are provided with notches 5 6, constituting roughened surfaces for holding the device in position. The portions 7 8 are straight, and the central portion is bent into the form of an eye 9. A ring 10 of wire is mounted upon the straight portions 7 8, its removal therefrom being prevented by means of the eye 9. The eyes 1 2 are brazed integrally with the portions 3 and 4, so as to be smooth.

The operation of my device is as follows: The bushy part of the cow's tail is surrounded by the semicircular portions 3 and 4, the roughened portions 5 and 6 serving to secure a hold upon the tail. The eyes 1 2 are next placed upon the opposite sides of the animal's leg, and the ring 10 is pushed forward from the position shown in full lines in Fig. 2 to that shown in dotted lines in said figure, thereby drawing the spring members together from the position shown in full lines in Fig. 2 to that shown in dotted lines in said figure, thus fastening the device securely upon the animal's tail and leg. The undesirable switching of the cow's tail is effectually prevented, thereby saving the milker from much annoyance and securing cleanliness of the milk.

When not desired for use, the device may be readily removed by sliding the ring 10 to the position shown in full lines in Fig. 2, whereupon the clamping members will assume the position shown in full lines in said figure.

Having thus described my invention, I claim as new and desire to secure by Letters Patent—

1. A device for preventing the switching of cows' tails, comprising a section of spring metal bent back upon itself so as to form two members each provided with an eye for clamping a portion of a cow's leg, said members having portions bent into substantially semicircular form and roughened internally for the purpose of clasping the animal's tail, and a sliding ring for forcing said members toward each other.

2. A device for preventing the switching of cows' tails, comprising an elastic member bent back upon itself so as to form two members, each provided with an eye for clamping a portion of a cow's leg, said members being bent into proper conformity for the purpose of clasping the animal's tail, and a sliding ring for forcing said members toward each other.

In testimony whereof I have signed my name to this specification in the presence of two subscribing witnesses.

DAVID McLELLAN.

Witnesses:
W. J. HUTCHESON,
H. C. THOMSON.